Patented Apr. 14, 1931

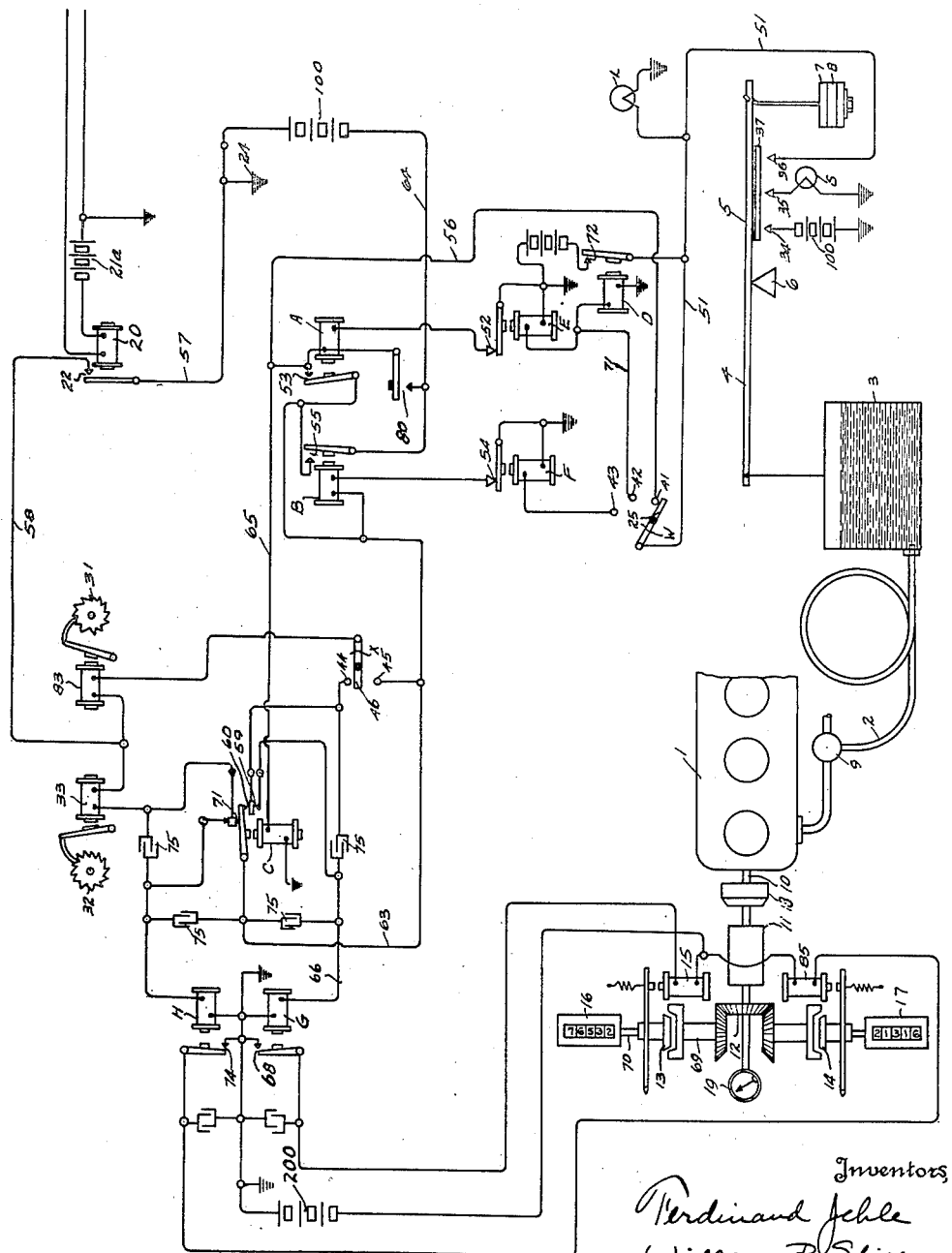

1,800,640

UNITED STATES PATENT OFFICE

FERDINAND JEHLE, WILLIAM R. SPILLER, AND HAROLD M. KING, OF CLEVELAND, OHIO, ASSIGNORS TO THE WHITE MOTOR COMPANY, OF CLEVELAND, OHIO, A CORPORATION OF OHIO

TESTING INSTRUMENT

Application filed March 28, 1929. Serial No. 350,578.

This invention relates to testing instruments and relates particularly to instruments for the precise ascertainment of elapsed time intervals between sequential occurrences.

More particularly the invention relates to a system and apparatus which is particularly adaptable for the determination of speed and fuel consumption of an automobile engine under predetermined conditions of load.

An object of the invention is to provide a testing mechanism of a type adaptable for use to measure the rate of utilization of any device utilizing any material, in terms of the time taken for the device, operating under given or determinable conditions, to utilize a predetermined amount of the material.

Another object of the invention is to provide means automatically operable upon the happening of a predetermined condition, adapted to indicate elapsed time thereafter until the occurrence of a second predetermined condition related to the first condition.

Another object of the invention is to provide a measuring mechanism applicable for use in ascertaining the efficiency and/or performance of an internal combustion engine, or other fuel consuming device.

Other objects of the invention and the invention itself will become more apparent from the following description of a system, and mechanism, embodying the principles of the invention, and in which description reference will be had to the accompanying drawing illustrating the said embodiment.

The drawing illustrates diagrammatically the mechanism and electrical circuits therefor, embodying the principles of the invention.

Referring now to the drawing, this shows diagrammatically, an electrical system involving various parts, such as relays, electrical switches, chronometer contacts, a source of current and the like, and which parts are designated by reference characters.

In the drawing, an automobile engine is shown at 1, supplied by a conduit 2 with liquid fuel, such as gasoline, from a tank 3 which is suspended from one arm of a lever having arms 4 and 5 pivoted on an intermediate fulcrum 6. A plurality of weights, such as 7 and 8, are removably secured to the end of the lever arm 5, tending to counter balance the weight of the tank 3 and liquid contained therein, as later described. The engine may be provided with a carburetor, indicated generally at 9, and a driving propeller shaft indicated at 10, which preferably drives a dynamometer mechanism 11 through the coupling 18.

At 16 and 17 are provided separate revolution counters, either of which may be actuated according to which of the two clutches 13 and 14 are moved to an operative position, by energization of the actuating electromagnet 15 or 85 associated therewith, whereby one or the other of the counters will be driven from the shaft 10 through the beveled gear train 12.

A tachometer 19 for indicating at all times the speed of the engine 1, is also driven from the shaft 10. A pair of elapsed time counters 31 and 32 are provided, each operable under the control of an electromagnet 33 and 83, each of which, upon deenergization, after being energized, operates its respective counting mechanism, shown conventionally at 31 and 32, respectively.

A number of relays A, B, C, D, E, F, G, and H, are each provided with an actuating electromagnet and associated relay contacts, the relays A, B, D, H and G, each being provided with a pair of contacts adapted to be "closed" when the relay is energized, whereas the relays F and E are each provided with a pair of contacts adapted to be "opened" when the relay is energized, and the relay C is provided with a plurality of switch contacts, three of which are adapted to be engaged when the relay is energized, and three of which are adapted to be disengaged when the relay is energized.

A relay is periodically operated under the control of a master clock controlling circuit and mechanism, not herein illustrated, by current from a source such as 21a. The relay is adapted to "make" and "break" a circuit comprising the relay 20 with contacts 22, and counter mechanisms 31 and 32 as subsequently described.

A source of current, such as the 12 volt storage battery shown at 100, may be employed to energize the various electro-responsive elements employed; it is shown as having one terminal connected to ground at 24, and although this ground connection may not actually exist, it is used, conventionally, in different parts of the drawing for convenience, as indicating all connections to a particular terminal of the battery 100.

Signal lamps S and L furnish indications to an observer of the conditions of operation of the system. A pair of electrical switches X and W are provided, the switch W having a switch blade 25 adapted to alternately make contact with any one of three contact points 41, 42 or 43, at the will of the operator, and the switch X having two contact points 44 and 45, alternately engageable by a switch blade 46.

The engine is provided with the necessary appurtenances such as an electrical ignition system to enable it to be operated by fuel supplied from the tank 3 carried on one arm 4 of the balanced scale beam. The scale beam carries weights such as 7 and 8 on its other arm 5, which when moved upwardly will effect "breaking" of contact between the three electrical contacts 34, 35 and 36 and an insulated blade 37, carried by the arm. When the arm 5 descends, the blade 37 will practically simultaneously engage the stationary contacts 34, 35 and 36.

The counting mechanisms, indicated generally at 16, 17 and 31 and 32, all are preferably provided with numbered indicators each of which is preferably provided with digital indications for indicating the number of current impulses passed through it during an elapsed time interval.

Condensers, shown variously in the diagram at 75, are provided, these, according to the common practice, being connected in multiple circuit with pairs of relay contacts, for the purpose of preventing arcing at the contacts, when these are separated.

A system comprising the above parts operates as follows, it being assumed first, that the tank 3 contains liquid fuel, supplied therefrom through the carburetor 9 to the engine 1. which is operated continuously during the test; that the weights 7 and 8 are originally insufficient to overpower the weight of the liquid contained in the tank 3 so that the beam arm 5 is lifted from the contacts 34, 35 and 36; that each of the weights 7 and 8, of which any number may be provided, are equivalent in weight to a predetermined quantity of liquid fuel of the kind contained in the tank 3, and that the blade 25 of the switch W is preliminarily rotated to engagement with the switch contact 41, and the blade 46 of the switch X is first placed in engagement with the contact 44.

The readings of the time counters 31 and 32 and the readings of the revolution counters 16 and 17, are first recorded for reference, and the relay 20 is continuously periodically operated. The engine drives the dynamometer 11 under predetermined condition of load, indicated by the dynamometer which is also noted. Continuous operation of the engine under the above conditions, after a period determined by the amount of fuel contained in the tank 3 relative to the weight comprising the weights 7 and 8 carried on the beam 5, will so deplete the supply of fuel in the tank 3, that the beam 5 will be lowered due to the greater weight supported by it, over the weight of the fuel containing tank 3.

When this occurs, the switch blade 37 carried by the beam will engage and interconnect the contacts 34, 35 and 36, and the ungrounded pole of battery 100, will be extended through contacts 34 and 35, to a signal lamp S, which always is lighted so long as the scale beam arm 5 is lowered. The ungrounded pole of battery 100 is also extended through contact 34, blade 37 and contact 36, through circuit conductor 51, and through the blade 25 and switch contact 41 of the switch W, to one side of the electromagnet of the relay A, whose other terminal is connected through "break" contacts 52 of the relay E to the ground pole of battery.

This will energize relay A to effect closure of its contacts 53 to energize the electromagnet of relay B, by current flowing through the contacts 53 of relays A, the winding of the relay B, and "break" contacts 54, to the grounded side of battery 100 of relay F. The relay B will, upon energization of its magnet, close its contacts 55 to directly extend the ungrounded pole of battery 100 through contacts 55 to the electromagnet windings of the relays A and B, in substitution of the connection from the ungrounded pole of battery through the switch W and contacts 34—36 of the scale beam arm.

The relays A and B being thus both operated, will remain in operation maintaining their contacts closed, independently of the position of the switch blade 25 or the scale arm 5, for so long as the "break" contacts 52 and 54, respectviely, of the relays E and F, remain closed. When the scale beam fell, as aforesaid, the lamp S was lighted to notify the operator of the fact, and the reminder lamp L is also lighted by current through the contacts 34 and 36, and remains lighted by flow of current from the ungrounded pole of battery through the serially connected "make" contacts 55 and 53 for the relays B and A, respectively, and through circuit conductors 56 and 51, and the contacts 25—41, of switch W.

The lamp L remains lighted until the switch blade 25 of the switch W is moved from contact 41.

The time counter 31 is caused to start to operate by the falling of the beam arm 5, by the effect of current supplied intermittently through its electromagnet winding 83 over a circuit comprising circuit conductor 57, leading from the ground pole of battery through the periodically closed relay contacts 22, circuit conductor 58, the winding 83 of the time counter 31, switch contacts 46—44 of the switch X, the two pairs of closed "make" contacts 59 and 60 of the relay C, which operate together with relays A and B open and close contacts 59 and 60, the circuit conductor 63, and the closed "make" contacts 55 of the relay B, the circuit conductor 64 leading to the ungrounded pole of battery 100; the relay C, meanwhile, is held energized by current supplied through circuit conductor 65 and "make" contacts 53 and 55, respectively, of relays A and B.

The revolution counter 16 is caused to start to count revolutions by the energization of the electromagnetic clutch 13, by current supplied through its electromagnet winding as a result of the operation of relay C. The relay C effects operation of the relay G by current supplied from grounded pole of battery through the winding of the electromagnet for relay G, through circuit conductors 66 and 63, the closed contacts 59 and 60 of the relay C and contacts 55 of the relay B, and circuit conductor 64 leading to the non-grounded pole of battery.

The relay G being energized, will close its contacts 68 to complete a circuit comprising the said contacts, the winding of the electromagnet for the clutch 13 and the source of current 200 which may be the 110 v. A. C. line. For as long as the electromagnetic clutch 13 is energized by current through its winding, the counter 16 will continuously operate to count revolutions of the engine 1 in a well known manner.

The clutch is effective when energized to join the driving spindle 69 to the counter spindle 70 and to disengage them when the clutch is denergized to discontinue driving the revolution counter.

Both revolution counters and the clutch controlled driving connections, therefore, are preferably alike, being intended for alternate use, and the same applies to the time counters 31 and 32, except that these are both substantially alike but are adapted either for alternate or for simultaneous use at times, as later described.

Immediately after the scale beam arm 5 is lowered by consumption of fuel or otherwise, the operator will then remove a weight from the arm equivalent to the amount of fuel which he wishes to supply to the engine in the time period of test, to be determined by the operation of the system.

The switch blade 25, subsequent to the removal of the weight 7 from the beam arm 5, is manually moved from contact 41 to contact 42 of the switch W thereby extinguishing the reminder lamp and preparing the relays D and E for simultaneous operation, when the scale beam 5, later, falls.

The revolutions counter 16 and the timing counter 31 being simultaneously operated, the first, at a rate proportional to the speed of the engine, and the second at a constant rate, during the first testing period above described, the test continues until sufficient of the gasoline from the tank 3 has been utilized by the engine 1, to effect relowering of the beam arm 5. The amount of gasoline required to be used to do this will be that amount equal in weight to the weight of the counterbalancing weight 7, previously removed from the scale arm 5.

At any time during this first testing period, the operator will have moved the switch blade 25 to engage the switch contact 42, which, however, will have no immediate effect due to the fact that the scale beam arm 5 is so lifted as to disengage the switch blade 37 from the contacts 34, 35 and 36.

When the beam arm again is lowered due to consumption of fuel, to reclose the contacts 34—37, 35—37 and 36—37, the ungrounded pole of battery is again connected to the signal lamp S, and the blade 25 of the switch W. This will effect simultaneous energization of the electromagnets for relays E and D by current supplied from the blade 25 through the switch contact 42 and the branched circuit conductor 71, and will effect relighting of the lamps S and L, to call attention to what may be termed the counter "change-over" operation.

The relays D and E being energized by current through their windings, their armatures will be attracted, that for the relay E effecting "breaking" of the contacts 52 in the circuit of relay A to deenergize the relay A, and the armature for the relay D extending the connection from the ungrounded pole of battery to circuit conductor 51, to maintain the lighting of the signal lamp L. Also, the closing of the contacts 72, resulting from the operation of relay D, maintains a connection from the ungrounded pole of battery to the circuit conductor 51, through the switch contacts 25—42, the relays D and E thus being energized by current supplied through the contacts 25—42 of the switch W, independently of the position of the scale beam arm 5.

The breaking of the contacts 52 of the relay E reopens the contacts 53 of the relay A by deenergizing the magnet of relay A, and as a consequence thereof the relay C is deenergized when current through the contacts 53 of relay A is interrupted.

The deenergization of relay C opens the contact sets 59 and 60, discontinuing energizing current through the relay G, which retracts its armature, breaking contacts 68 in the circuit of the electromagnet for clutch 13. The clutch 13 being deenergized the revolutions counter 16 is put out of operation and discontinues the counting of revolutions of the engine 1. Also the breaking of the contacts 59 and 60 interrupts the circuit comprising the circuit conductors 63 and the said contacts for supplying current to the timing counter magnet 31, which immediately discontinues the counting of time intervals.

The readings of counted revolutions from the counter 16 and counted time intervals from the timer 31, therefore, represent the performance, in number of revolutions, of the engine during the first testing period, wherein a predetermined amount of gasoline, equal in weight to the weight 7, was utilized by the engine.

The duration of the testing period described, is indicated by the reading of the time counter 31, the period itself being terminated, as before described, by the reclosing of the contacts 34—37 and 36—37, effecting energization of the relay E.

The "change-over" operation, as above described, initiated by the falling of the beam arm 5, and effecting, as before described, deenergization of the relays A and C while energization of the relays B, E, and D is maintained, effects a switching of energizing circuits from the magnet of the counter clutch 13 to that for the counter clutch 14, and from that of timing counter 31 to that of the timing counter 32.

The energizing circuit for the clutch 14 for the revolutions counter 17, includes the battery 100 and "make" contacts 74 of the relay H, which is energized by current from the ungrounded pole of battery directed through its winding, through "make" contacts 55 of the relay B, circuit conductor 63, and a pair of the "break" contacts 71, reclosed by the retraction of the armature of relay C.

The circuit is completed through the winding 33 of the counter 32, circuit conductor 58 and the periodically closed contacts 22—23. The time counter 32 will thereupon be continuously periodically energized in the place of the counter 31.

The revolutions and timing counter 17 and 32 respectively, will continue to be operated until when, later in the operation of the system, the beam arm 5 is again, as before, raised and later relowered. This is effected by the operator, desiring to initiate a final testing period for fuel utilization, taking another weight such as 8 from the beam arm 5, and moving the blade 25 of the switch W to cause it to engage the contact point 43.

The removal of the weight 8 will disengage the scale arm switch blade 37 from the contacts 34, 35 and 36, extinguishing the signal lamp S. The reminder lamp L is extinguished by the breaking of the energizing circuit for relays D and E by the movement of the switch blade 25 from contact 42 and the consequent retraction of the armature relay D breaking the relay contacts 72 in the circuit of the reminder lamp L.

The engagement of the switch blade 25 with the contact 43 while the scale beam arm 5 is up, will condition the relay F to discontinue all counting operations upon the subsequent falling of the scale beam arm, when the amount of fuel corresponding to the weight of the removed weight 8, has been consumed by the engine; when this occurs current passed through the scale beam contacts 34—37—36, through the circuit conductor 51 and contacts 25—43 of the switch W, will energize the relay F, which, breaking its contacts 54, will break the circuit of the relay B.

The breaking of the relay B causes it to retract its armature, breaking its contacts 55 in the previously described energizing circuit for the time counter 32 and the relay H. The time counter 32 will thereupon discontinue recording time intervals and the relay H will be deenergized, breaking its contacts in the energizing circuit of the counter clutch 14, so that the counter 17 will discontinue recording revolutions of the crank shaft.

The reminder lamp L, as well as the signal lamp S, will remain lighted until the beam arm is again lifted, separating the contacts 34, 35, 36 and 37. Should it be desired to repeat the test previously made and first described, the switch blade 25 may be replaced, in contact with the switch contact 41, whereupon the operation will be repeated, in the same manner as aforesaid. The repeated operation may be had by removing additional weights, not shown, like the weights 7—8, from the scale beam arm 5 or by recharging the tank 3 with fuel and replacing the previously removed weights 7 and 8 and then removing them sequentially as before described.

Ordinarily the blade of switch X is placed on the contact 44, and the above description of the operation of the system is made with this assumption. However, placing the switch blade 46 into its alternate position in engagement with contact 45, the time counter 31 is continuously connected in circuit independently of the contacts of relay C, and it will continually operate to count time intervals independently of the position of the scale beam.

Meanwhile the time counter 32 will be operated under the control of the relay C, and therefore under the control of the scale beam position; an arithmetical difference of the readings of the time counter 32 and the time counter 31 will, taken with the reading of time counter 32, indicate the seconds' time during which the scale beam is in either of its alternate positions.

The mechanism may be operated any desired number of times by alternately placing the blade 25 of the switch W upon the contacts 42, 41, 42, 41, etc., for as many times as it is desired to effect registrations of lapsed time and to count the revolutions of the engine, in periods, by use of the alternate sets of counters herein provided.

When it is desired to conclude the test, the switch blade 25 will be placed on the contact 43 and this, assuming that the scale beam arm 5 is up, will condition the relay F to discontinue all counting operations upon the subseqent falling of the scale beam arm when the amount of fuel corresponding to the weight of the last removed weight 8 has been entirely consumed, as previously described.

A push button switch having a pair of normally opened contacts 80 is provided in order to initiate a recording period independently of the position of the scale beam 5 and is adapted to connect the ungrounded pole of battery therein to the circuit conductor 56 and energize relays A and B consecutively, independently of the scale beam and the switch W. Under some conditions of test, this alternate method of starting is found desirable.

Having thus described our invention as applied to a specific embodiment, we are aware that numerous and extensive departures may be made from the embodiment herein illustrated and described but without departing from the spirit of our invention.

We claim:

1. In a mechanism for testing the performance of an engine operable by determining the rate of utilization of fuel delivered thereto, a receptacle for fuel, an electrical switch, a balance, means operable responsive to variations in weight from predetermined weights of fuel in the receptacle to operate said switch, adjustable weighting means effective to predetermining the weight of fuel required to operate the switch, means to effect delivery of fuel from the receptacle to the engine to operate the engine, a source of electrical current, electrical circuit conductors extending from the said source to said switch, a counter adapted to continuously register engine crank shaft revolutions, a timing counter adapted to continuously register the number of elapsed time intervals of predetermined length during the registering of said crank shaft revolutions, and means comprising a plurality of electrical relays, said source of current, and said circuit conductors, responsive to switch actuating movements of said balance means to start and stop said counters.

2. In a testing system for determining the relations existing between performance of a mechanism and flow of fluid incidental to its performance, comprising controllable means for predetermining the condition of load of the mechanism, a pair of counters for integratingly registering units of mechanism performance and units of elapsed time respectively, a second like pair of counters, controlling means adapted to initiate the operation of said first pair of recorders during a first testing period, a receptacle for fluid and means adapted to continuously supply fluid from the receptacle to the mechanism, means responsive to depletion of fluid in the receptacle adapted to automatically discontinue the operation of said first pair of counters and to simultaneously initiate the operation of said second set of counters, and means automatically operable upon a further predetermined depletion of fluid in the receptacle to discontinue the operation of the said second pair of counters.

3. In a testing system for determining the relations existing between performance of a mechainsm and flow of fluid incidental to its performance, comprising controllable means for predetermining the condition of load of the mechanism, a pair of counters for integratingly recording units of mechainsm performance and units of elapsed time respectively, a second like pair of recorders, controlling means adapted to initiate the operation of said first pair of recorders during a first testing period, a receptacle for fluid and means adapted to continuously supply fluid from the receptacle to the mechanism, means responsive to the depletion of fluid in the receptacle adapted to automatically discontinue the operation of said first pair of counters and to simultaneously initiate the operation of said second set of counters, and means automatically operable upon a further predetermined depletion of fluid in the receptacle to discontinue the operation of the said second pair of counters, a signalling means adapted to indicate predetermined degrees of depletion of fluid in the receptacle.

4. In a testing system for determining the relations existing between performance of a mechanism and flow of fluid incidental to its performance, comprising controllable means for predetermining the condition of load of the mechainsm, a pair of counters for integratingly recording units of mechanism performance and units of elapsed time respectively, a second like pair of counters, controlling means adapted to initiate the operation of said first pair of counters during a first testing period, a receptacle for fluid and means adapted to continuously supply fluid from the receptacle to the mechanism, means responsive to the depletion of fluid in the receptacle adapted to automatically discontinue the operation of said first pair of counters and to simultaneously initiate the operation of said second set of counters, and means automatically operable upon a further predetermined depletion of fluid in the receptacle to discontinue the operation of the said second pair of counters, and means adapted to be set prior to the operation of the system, or any fluid consuming period thereof, adapted to effect continuous operation of one of the time counters during all subsequent testing periods, and means responsive to an ultimate predetermined degree of depletion of fluid in the receptacle to discontinue the operation of said last named time counter.

5. In a testing system for determining the relations existing between performance of a mechanism and flow of fluid incidental to its performance, comprising controllable means for predetermining the condition of load of the mechanism, a pair of counters for integratingly registering units of mechanism performance and units of elapsed time respectively, a second like pair of counters, controlling means adapted to initiate the operation of said first pair of recorders during a first testing period, a receptacle for fluid and means adapted to continuously supply fluid from the receptacle to the mechanism, means responsive to the depletion of fluid in the receptacle adapted to automatically discontinue the operation of said first pair of counters and to simultaneously initiate the operation of said second set of counters, and means automatically operable upon a further predetermined depletion of fluid in the receptacle to discontinue the operation of the said second pair of counters, said recorder controlling means comprising an electrical circuit including a source of current, relay means, a scale balance comprising means to weigh the fluid containing receptacle, a switch operable by said scale balance upon predetermined degrees of depletion of fuel in the receptacle, adapted to effect operation of said relay means by current from said source, energizing circuits for said counters comprising said source of current, and relay contacts of said relay means, said relay means adapted to control the energizing circuits of the recorders upon operation of said electrical switch.

6. In a testing system for determining the relations existing between performance of an internal combustion engine and flow of liquid fuel incidental to its performance, comprising controllable means for predetermining the condition of load of the internal combustion engine, a pair of counters for integratingly registering units of engine performance and units of elapsed time respectively, a second like pair of counters, controlling means adapted to initiate the operation of said first pair of counters during a first testing period, a receptacle for fuel and means adapted to continuously supply liquid fuel from the receptacle to the engine, means responsive to the depletion of fuel in the receptacle adapted to automatically discontinue the operation of said first pair of counters and to simultaneously initiate the operation of said second set of counters, and means automatically operable upon a further predetermined depletion of fuel in the receptacle to discontinue the operation of the said second pair of counters.

7. In a testing system for determining the relations existing between performance of a mechanism and the rate of utilization of a material utilized incidental to its performance, comprising controllable means for predetermining the condition of load of the mechanism, a pair of counters for integratingly registering units of mechanism performance and units of elapsed time respectively, a second like pair of counters, controlling means adapted to initiate the operation of said first pair of counters during a first testing period, a receptacle for the material and means adapted to continuously supply material from the receptacle to the mechanism, means responsive to depletion of material in the receptacle adapted to automatically discontinue the operation of said first pair of counters and to simultaneously initiate the operation of said second set of counters, and means automatically operable upon a further predetermined depletion of material in the receptacle to discontinue the operation of the said second pair of counters.

In testimony whereof we hereunto affix our signatures this 13th day of March, 1929.

FERDINAND JEHLE.
WILLIAM R. SPILLER.
HAROLD M. KING.